(12) United States Patent
Lynam (10) Patent No.: US 7,338,177 B2
(45) Date of Patent: Mar. 4, 2008

(54) MIRROR REFLECTIVE ELEMENT FOR A VEHICLE

(75) Inventor: Niall R. Lynam, Holland, MI (US)

(73) Assignee: Donnelly Corporation, Holland, MI (US)

( * ) Notice: Subject to any disclaimer, the term of this patent is extended or adjusted under 35 U.S.C. 154(b) by 349 days.

(21) Appl. No.: 10/993,302

(22) Filed: Nov. 19, 2004

(65) Prior Publication Data

US 2005/0134983 A1    Jun. 23, 2005

Related U.S. Application Data

(60) Provisional application No. 60/525,952, filed on Nov. 26, 2003.

(51) Int. Cl.
*G02B 5/08* (2006.01)
*B60R 1/04* (2006.01)

(52) U.S. Cl. ............ 359/839; 359/872; 359/603; 359/604; 340/425.5; 340/815.4

(58) Field of Classification Search ............ 359/603, 359/604, 606, 839, 872, 608, 609, 883; 340/425.5, 340/525, 815.4; 362/494
See application file for complete search history.

(56) References Cited

U.S. PATENT DOCUMENTS

| | | | |
|---|---|---|---|
| 4,435,042 A | 3/1984 | Wood et al. | |
| 4,436,371 A | 3/1984 | Wood et al. | |
| 4,588,267 A | 5/1986 | Pastore | |
| 4,826,289 A | 5/1989 | Vandenbrink et al. | |
| 4,882,565 A * | 11/1989 | Gallmeyer | 340/461 |
| 4,948,242 A | 8/1990 | Desmond et al. | |
| 5,014,167 A | 5/1991 | Roberts | |
| 5,073,012 A | 12/1991 | Lynam | |
| 5,115,346 A | 5/1992 | Lynam | |
| 5,178,448 A | 1/1993 | Adams et al. | |
| 5,179,471 A | 1/1993 | Caskey et al. | |

(Continued)

FOREIGN PATENT DOCUMENTS

WO    WO 2004/026633 A2    4/2004

(Continued)

OTHER PUBLICATIONS

Commonly Assigned U.S. Appl. No. 11/021,065, filed Dec. 23, 2004, by Applicants Ian A. McCabe et al.

*Primary Examiner*—Ricky D. Shafer
(74) *Attorney, Agent, or Firm*—Vandyke, Gardner, Linn & Burkhart LLP (57) ABSTRACT

An interior rearview mirror assembly for a vehicle includes a prismatic mirror element and a display element. The prismatic mirror element includes a wedge-shaped prism element having a front surface and a rear surface and a second element having a transflective reflector on a first surface thereof. The front surface of the prism element generally faces a driver of the vehicle when the mirror assembly is installed in the vehicle, and the rear surface is opposite the front surface. The transflective reflector coated first surface of the second element is attached to the rear surface of the prism element via an optically matching medium. The display element is positioned to the rear of the prismatic mirror element and operates to display information through the prismatic mirror element so as to be viewable by a driver of the vehicle when the display element is operated to emit visible light.

32 Claims, 2 Drawing Sheets

U.S. PATENT DOCUMENTS

| | | |
|---|---|---|
| 5,207,492 A | 5/1993 | Roberts |
| 5,313,335 A * | 5/1994 | Gray et al. ................. 359/839 |
| 5,327,288 A | 7/1994 | Wellington et al. |
| 5,355,245 A | 10/1994 | Lynam |
| 5,481,395 A * | 1/1996 | Byker ........................ 359/272 |
| 5,521,760 A * | 5/1996 | De Young et al. .......... 359/601 |
| 5,523,877 A | 6/1996 | Lynam |
| 5,530,240 A * | 6/1996 | Larson et al. ......... 250/214 AL |
| 5,535,056 A | 7/1996 | Caskey et al. |
| 5,587,236 A | 12/1996 | Agrawal et al. |
| 5,649,756 A | 7/1997 | Adams et al. |
| 5,668,663 A | 9/1997 | Varaprasad et al. |
| 5,708,410 A * | 1/1998 | Blank et al. ................. 340/438 |
| 5,724,187 A | 3/1998 | Varaprasad et al. |
| 5,751,489 A | 5/1998 | Caskey et al. |
| 5,788,357 A | 8/1998 | Muth et al. |
| 5,922,176 A | 7/1999 | Caskey |
| 6,065,840 A | 5/2000 | Caskey et al. |
| 6,111,683 A * | 8/2000 | Cammenga et al. ........ 359/267 |
| 6,170,956 B1 * | 1/2001 | Rumsey et al. ............. 359/839 |
| 6,196,688 B1 | 3/2001 | Caskey et al. |
| 6,286,965 B1 | 9/2001 | Caskey et al. |
| 6,318,870 B1 | 11/2001 | Spooner et al. |
| 6,329,925 B1 | 12/2001 | Skiver et al. |
| 6,428,172 B1 | 8/2002 | Hutzel et al. |
| 6,501,387 B2 | 12/2002 | Skiver et al. |
| 6,520,667 B1 * | 2/2003 | Mousseau ................... 362/494 |
| 6,642,851 B2 | 11/2003 | Deline et al. |
| 6,657,767 B2 * | 12/2003 | Bonardi et al. ............. 359/265 |
| 6,690,268 B2 | 2/2004 | Schofield et al. |
| 2002/0159270 A1 | 10/2002 | Lynam et al. |
| 2003/0043589 A1 | 3/2003 | Blank |
| 2004/0264011 A1 | 12/2004 | Lynam |
| 2005/0078389 A1 | 4/2005 | Kulas et al. |

FOREIGN PATENT DOCUMENTS

| | | |
|---|---|---|
| WO | WO 2004/042457 A3 | 5/2004 |
| WO | WO 2004/058540 A2 | 7/2004 |
| WO | WO 2004/103772 A3 | 12/2004 |

\* cited by examiner

MIRROR REFLECTIVE ELEMENT FOR A VEHICLE

CROSS REFERENCE TO RELATED APPLICATION

The present application claims benefit of U.S. provisional application Ser. No. 60/525,952, filed Nov. 26, 2003 which is hereby incorporated herein by reference in its entirety.

FIELD OF THE INVENTION

The present invention relates generally to the field of rearview mirror elements for vehicles and, more particularly, to interior rearview mirror assemblies which incorporate a display for displaying information to the driver of the vehicle through an interior rearview mirror element.

BACKGROUND OF THE INVENTION

The base level interior rearview mirror element for a vehicle is often a prismatic rearview mirror element, which may provide a low cost complete mirror assembly for the vehicle. The complete mirror assembly is often economically assembled by snapping or inserting the toggle assembly and prismatic reflective element into the casing at the front or bezel portion of the mirror casing substantially immediately after the casing (which may be formed of a hot molded polypropylene or the like) is formed and while the casing is still hot and pliable. It is often desirable to provide an electronic feature in the mirror assembly, such as an accessory and an associated display and/or the like. Other complete mirror assembly types are known in the art, such as two piece housing assemblies, such as described in U.S. Pat. Nos. 5,178,448; 5,649,756; 6,329,925; and 6,501,387, which are hereby incorporated herein by reference.

Typically, when manufacturing a prismatic reflective element, the reflective layer (typically a silver mirror reflector layer overcoated with a copper corrosion resistant layer and protected with a several mil thick protective paint layer, all applied on a chemical silvering line, as known in the mirror art) is first applied to a surface of approximately 6 mm thick flat float soda lime glass, typically on the air side of the float glass, where the surface is a high quality, smooth, substantially scratch free, pristine surface. The layer of paint that is applied over the silvering layer protects the reflective layer from mechanical/physical damage during subsequent processing of the silvered float glass to form an automotive interior prismatic mirror element shape.

Thus, the first stage of a glass automotive prismatic element manufacturing process comprises flat glass that is silvered on a second surface that opposes a first, unsilvered glass surface (wherein the first surface is the side of the glass element that ultimately generally faces and is closest to a driver of the vehicle when the complete mirror assembly is installed in the vehicle, while the second surface is opposite to/opposing the first surface). The first glass surface is then ground, such as by diamond wheel grinding while the silvered/paint protected glass side is held on a chuck or fixturing device, or while the silvered/paint protected glass is conveyed through an in-line grinding process with the silvered/painted surface contacting the conveying element, such as rollers or the like, and finely polished to create a glass surface now slanted at approximately a three to four degree prism angle relative to the second or silvered surface, while the layer of paint protects the reflective/silvered layer from damage during the grinding/polishing of the first glass surface.

Conventional paint systems are absorbing, such that the painted/silvered prism element is non-transparent. Thus, and such as described in U.S. Pat. No. 5,285,060, which is hereby incorporated herein by reference, it is known to create a window, such as by sandblasting or laser ablation or the like, in the painted/silvered layers for a display element to display information through the window and through the prism for viewing by a driver of the vehicle. However, this removes the protective paint and the silvered layers from the rear surface of the prism.

Therefore, there is a need in the art for an improved prismatic reflective element for a mirror assembly which overcomes the shortcomings of the prior art.

SUMMARY OF THE INVENTION

The present invention provides a reflective element for a prismatic interior rearview mirror assembly which has a display on demand or transflective display that is viewable through the reflective element by a driver of the vehicle. The display includes a transflective layer or layers that is/are sandwiched between a rear or second surface of the prism element (the surface that faces away from the driver of the vehicle when the complete mirror assembly is installed in the vehicle) and a thin transparent glass or polymeric substrate or film or layer, preferably a thin rigid transparent glass or polymeric substrate or a flexible polymeric film or layer, such as a Mylar film or the like, disposed at the rear or second surface of the prism element.

According to an aspect of the present invention, an interior rearview mirror assembly for a vehicle includes a prismatic transflective element and at least one display element. The prismatic transflective element includes a wedge-shaped transparent polymeric or glass prism element having a first surface and a second surface, a flat, preferably thin, transparent element or substrate, and a transflective reflector coating disposed on the second surface of the prism element or a first surface of the substrate. The first surface of the prism element generally faces a driver of the vehicle when the completed interior rearview mirror assembly is installed in the vehicle, and the second surface is generally opposite to the first surface. The flat substrate is optically coupled or connected to (such as via an optically matching adhesive or layer of material or medium) the second surface of the prism element. The optically matching medium, such as an optical adhesive or the like, is optically substantially matched with the refractive index of the prism element. The optically matching medium, such as an optical adhesive or other optical material, optically couples and connects, such as by adhering, to the transflective coating and to the second surface of the prism element or to the first surface of the substrate to connect or couple or adhere the substrate to the prism element. The display element is positioned at a second surface of the substrate and is operable to display information through the substrate and the prism element so as to be viewable by a driver of the vehicle when the mirror assembly is installed in the vehicle.

Therefore, the present invention provides an interior rearview mirror assembly which includes a prismatic reflective element and a display on demand or transflective display that is viewable through the prismatic reflective element. The transflective display may be economically manufactured by economically coating a flat sheet or substrate (preferably of thin transparent glass) with a transflective layer or layers and adhering or otherwise bonding or securing the coated substrate to the rear surface of the prism element. The flat sheet may be coated with the transflective layer or layers and then may be cut to the desired shape to generally match the shape of the prism element. Alternatively, a flat, uncoated, transparent sheet of glass or a polymer resin (preferably of dimension greater than about ten inches by about ten inches or thereabouts) may be cut into individual uncoated, transparent window shapes that match the shape contour of the prism element and thereafter may have the transflective layer or layers deposited onto the cut, clear glass flat shapes. The clear, non-coated prism element may be ground to the wedge shape before the separately fabricated flat shape or substrate with the transflective layer or layers is attached or coupled to the rear surface of the prism element. The transflective layer or layers, when coupled to the prism element, are thus protected from damage and from the environmental elements because the layer or layers are essentially sealed between the rear flat substrate and the front prism element. The coated rear flat substrate may be coupled to the prism element with an optical medium, such as an optical adhesive or with a laminating interlayer, which may substantially match the optical qualities of the prism element, such as the refractive index of the prism element. The optical medium or adhesive or interlayer may fill in and optically mask, via optical matching or optical coupling, any scratches or imperfections that may exist on the rear surface of the prism element. The present invention thus provides a low cost transflective prismatic reflective element assembly for a mirror assembly of a vehicle.

These and other objects, advantages, purposes and features of the present invention will become apparent upon review of the following specification in conjunction with the drawings.

DESCRIPTION OF THE PREFERRED EMBODIMENTS

Figure 1:
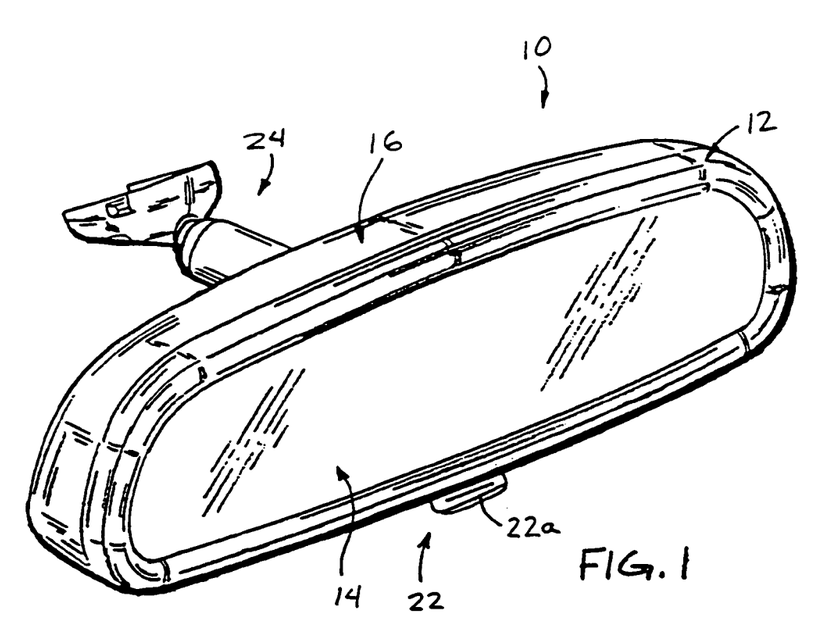
FIG. 1 is a front perspective view of an interior rearview mirror assembly in accordance with the present invention.
Figure 2:
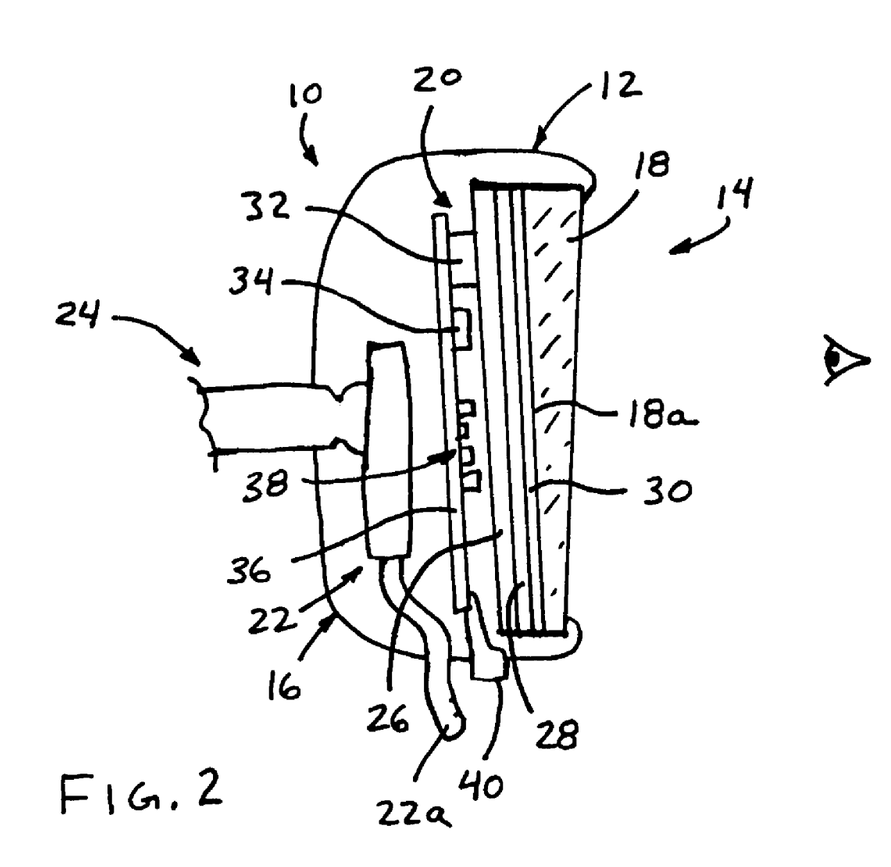
FIG. 2 is a sectional view of an interior rearview mirror assembly having a display on demand or transflective prismatic reflective element in accordance with the present invention.

Referring now to the drawings and the illustrative embodiments depicted therein, an interior rearview mirror assembly 10 for a vehicle includes a bezel portion or bezel portion 12 and a reflective element assembly 14 positioned at and at least partially within the bezel portion and/or bezel portion (FIGS. 1 and 2). Mirror assembly 10 includes a rear casing portion 16, preferably molded from a polyolefin material, such as a polypropylene material, or from an ABS material, an engineering resin material, such as a filled or unfilled nylon material, or the like. As shown in FIG. 2, reflective element assembly 14 includes a wedge-shaped prism or prism element 18 and a display on demand or transflective display or display element 20 at a rearward surface 18a of prism element 18, such that transflective display 20, when activated, is viewable by a driver of the vehicle through prism element 18.

Prismatic mirror assembly 10 may include features and components of known or proposed prismatic mirror assemblies, such as the types described in U.S. Pat. Nos. 6,318,870; 5,327,288; 4,948,242; 4,826,289; 4,436,371; and 4,435,042, and PCT Application No. PCT/US04/015424, filed May 18, 2004 by Donnelly Corporation et al. for MIRROR ASSEMBLY FOR VEHICLE; and U.S. patent application Ser. No. 10/933,842, filed Sep. 3, 2004 which are hereby incorporated herein by reference. As shown in FIG. 1, interior rearview mirror assembly 10 may include a toggle assembly 22 and a mounting portion 24, which may be pivotally connected to toggle assembly 22 and mounted to the vehicle to provide pivotal movement of the casing and bezel portion and the reflective element relative to the vehicle. Toggle assembly 22 may include a toggle member 22a, which may be actuated or moved by a user to adjust the bezel portion and reflective element relative to the vehicle. Optionally, toggle member 22a may comprise a soft touch surface or portion, such as disclosed in U.S. Pat. No. 6,318,870, which is hereby incorporated herein by reference. The mounting portion 24 may be mounted to the vehicle, such as to an interior surface of the vehicle windshield or to a header portion of the vehicle or the like, via any mounting arm and button or any other mounting arrangement, such as the types disclosed in U.S. Pat. Nos. 5,671,996; 5,813,745; 5,673,994; 5,820,097; 5,708,410; 5,576,687; 5,521,760; 5,330,149; 5,100,095; 5,058,851; 4,930,742; 4,936,533; 4,436,371; 4,524,941; 4,435,042; and/or 4,646,210, and/or U.S. provisional applications Ser. No. 60/609,642, filed Sep. 14, 2004; and Ser. No. 60/624,091, filed Nov. 1, 2004, which are hereby incorporated by reference herein, without affecting the scope of the present invention.

Bezel portion 12 of interior rearview mirror assembly 10 preferably comprises a unitary or one-piece bezel portion (preferably molded from a thermoplastic resin, such as polypropylene or the like), which receives the prismatic reflective element therein. The toggle assembly 22 and the prismatic reflective element 14 may be secured into place in the bezel portion 12 while the molded bezel portion (preferably the freshly molded bezel portion) is still warm and pliable, such as disclosed in U.S. Pat. No. 4,436,371, issued to Wood et al., which is hereby incorporated herein by reference. When the molded bezel portion (preferably the freshly molded bezel portion and thus just exiting the injection molding press, or alternately, and less desirably, a heated bezel portion having been heated, such as in an oven or the like, to make the bezel portion warm and pliable) cools and shrinks, the bezel portion grips around the toggle assembly and the prismatic reflective element to retain the toggle assembly and the reflective element in the mirror assembly. Optionally, however, the mirror assembly may comprise other types of casings or bezel portions or the like, such as described in U.S. Pat. Nos. 6,439,755; 4,826,289; and 6,501,387; and/or PCT Application No. PCT/US04/015424, filed May 18, 2004 by Donnelly Corporation et al. for MIRROR ASSEMBLY FOR VEHICLE; and U.S. patent application Ser. No. 10/933,842, filed Sep. 3, 2004, which are all hereby incorporated herein by reference.

As shown in FIG. 2, prismatic interior mirror reflective element 14 includes display on demand, transflective display 20 for displaying or providing information to a driver or occupant of the vehicle through the reflective element 14. Reflective element 14 includes the generally wedge-shaped mirror substrate or prism element 18 and a rear flat transparent shape or substrate 26 with a transflective layer or layers 28 disposed thereon. The shape or substrate 26 may be coupled to or adhered to or applied to the rear surface 18a (the surface facing away from the driver of the vehicle when the complete mirror assembly is installed in the vehicle) of prism element 18, such as via an optical medium 30, such as an optical adhesive layer or the like. The transflective layer or layers 28 may substantially reflect images back through the prism element to the driver of the vehicle, while allowing light emitted from a display element or elements 32 (to provide illumination or information) to be transmitted through the rear or flat substrate 26 and prism element 18, so as to be viewable through the reflective element 14 by the driver of the vehicle. Preferably, the transflective layer or layers provides greater than approximately 50 percent reflectivity of light incident thereon, more preferably greater than approximately 60 percent reflectivity of light incident thereon, and most preferably greater than approximately 70 percent reflectivity of light incident thereon, while providing preferably greater than approximately 5 percent transmissivity of light therethrough, more preferably greater than approximately 12 percent transmissivity of light therethrough, and most preferably greater than approximately 20 percent transmissivity of light therethrough.

Display element 32 may be a light emitting element, such as a vacuum fluorescent (VF) display element, a light emitting diode (LED) display element (such as an inorganic LED or an organic light emitting diode (OLED) display element, such as disclosed in U.S. Pat. Nos. 6,690,268 and 6,428,172, and in U.S. patent application Ser. No. 10/054,633, filed Jan. 22, 2002, now U.S. Pat. No. 7,195,381 which are hereby incorporated herein by reference). Also, the display may be a back lit iconistic display, such as disclosed in U.S. Pat. Nos. 6,642,851; 6,501,387; and 6,329,925, which are hereby incorporated herein by reference, or can be a back lit liquid crystal display (LCD) or the like. In this regard, and where text or other information is desired to be displayed via a display on demand/transflective mirror element, such as disclosed herein and as disclosed in PCT Application No. PCT/US03/29776, filed Sep. 19, 2003 by Donnelly Corp. et al. for MIRROR REFLECTIVE ELEMENT ASSEMBLY which is hereby incorporated herein by reference, in certain applications, it is preferable to use a multi-pixel, dot-matrix liquid crystal display element to the rear of the display on demand/transflective mirror element. In this regard, it is most preferable to use high intensity, high efficiency light emitting diodes, such as disclosed in U.S. Pat. Nos. 6,690,268 and 6,428,172, and in U.S. patent application Ser. No. 10/054,633, filed Jan. 22, 2002, now U.S. Pat. No. 7,195,381 which are hereby incorporated herein by reference. Also, electroluminescent display elements/backlighting may be used as a display element, or backlighting via an incandescent light source may also be used.

Transflective layer or stack of layers 28 comprises one or more layers of a metallic material, such as a layer of silver, aluminum or an alloy of silver or an alloy of aluminum or other metal or metal alloy or the like. The transflective layer or layers may include one or more non-metallic substantially transparent layers, such as a tin oxide (doped or undoped) or indium tin oxide (ITO) or any other similar layer or coating or the like (such as indium cerium oxide (ICO), indium tungsten oxide (IWO), or indium oxide (IO) layers or the like or a zinc oxide layer or coating, or a zinc oxide coating or the like doped with aluminum or other metallic materials, such as silver or gold or the like, or other oxides doped with a suitable metallic material or the like). Such DOD transflective layers are known and examples of such layers are described in U.S. Pat. Nos. 6,690,268; 5,668,663 and/or 5,724,187, and/or in U.S. patent application Ser. No. 10/054,633, filed Jan. 22, 2002, now U.S. Pat. No. 7,195,381 which are all hereby incorporated herein by reference. Optionally, the transflective layer or layers may comprise multiple layers that may cooperate to transmit particular spectral bands of light, while substantially reflecting other light, such as the types of layers described in PCT Application No. PCT/US03/29776, filed Sep. 19, 2003 by Donnelly Corp. et al. for MIRROR REFLECTIVE ELEMENT ASSEMBLY which is hereby incorporated herein by reference. The transflective layer or layers may be substantially color neutral, or may be tinted, such as tinted blue, such as described in U.S. Pat. Nos. 5,073,012; 5,115,346; 5,355,245; and 5,523,877, which are hereby incorporated herein by reference. Optionally, any of the front prism element, the optically coupling medium and the rear flat substrate may be substantially color neutral, or may be tinted, such as tinted blue, such as described in U.S. Pat. Nos. 5,073,012; 5,115,346; 5,355,245; and 5,523,877, which are hereby incorporated herein by reference.

A single thin metal layer, such as a layer of silver or aluminum or silver alloy or aluminum alloy or the like, may be used as the transflective coating. Suitable materials for such a transflective coating may be found in U.S. Pat. Nos. 4,588,267; 5,668,663; and 5,724,187, which are hereby incorporated herein by reference. Further, as an alternate to the above, a dichroic transflective stack can be utilized, such as disclosed in U.S. Pat. Nos. 5,014,167; 5,207,492; and 5,788,357, which are hereby incorporated herein by reference.

The transflective layer or stack of layers 28 may be selected and applied or deposited on the flat shape or substrate 26, such as via known methods, such as in a vacuum deposition chamber or the like. For example, the transflective layer or layers 28 may be coated or applied or disposed on the surface of the shape or substrate via a sputter coating deposition process or the like. Such a sputter coating deposition process may be performed in a vacuum deposition chamber and may be performed on an uncut large flat sheet of glass from which, in a subsequent manufacturing operation, multiple shapes of the shape matching the front prism element can be cut. The coated glass sheet may then be cut into the desired shapes or substrates, such as using a CNC cutting apparatus and process, a laser cutter, a water jet cutter or the like, such as described in U.S. provisional applications Ser. No. 60/531,838, filed Dec. 23, 2003; Ser. No. 60/553,842, filed Mar. 17, 2004; and Ser. No. 60/563,342, filed Apr. 19, 2004, which are hereby incorporated herein by reference. A coating facility thus may purchase large flat sheets of glass and coat the sheets and then cut the substrates from the glass for use in the transflective prismatic element. Such a process reduces the costs and difficulties that otherwise may be associated with providing coated shapes or substrates for such a use. Also, by coating a large flat sheet of glass for example, difficulties that may be encountered in coating individual wedge-shaped clear prism shapes or parts (or, for that matter, in coating interior mirror dimensioned relatively small individual cut shapes) are reduced.

Optionally, and using the teachings of U.S. Pat. No. 5,523,877 and U.S. patent application Ser. No. 10/229,573, filed Aug. 28, 2002 by Blank for VEHICLE MIRROR SYSTEM WITH LIGHT CONDUITING MEMBER, now U.S. Pat. No. 7,008,090 which are hereby incorporated herein by reference, a near infrared absorbing/reflecting material or element or compound or the like may be incorporated into the substrate 26 or transflective layer or layers 28 or into the optically matching medium 30 to reduce the intensity of infrared or near infrared illumination, such as by filtering out infrared or near infrared illumination (such as illumination or radiation within a spectral range of approximately 750 nm to approximately 1200 nm) from transmitting through the reflective element 14. Optionally, a photo sensor or light sensor 34 may be disposed behind the substrate 26, while the near infrared absorbing material may reduce or limit infrared or near infrared energy from transmitting through the reflective element 14 to the photo sensor, such that the photo sensor will not be substantially adversely affected by the near infrared energy. Preferably, such photo sensors comprise photo-diodes or photo-transistors, and preferably silicon-based photo sensors, such as disclosed in U.S. patent application Ser. No. 10/427,026, filed Apr. 30, 2003 by Drunimond et al. for VEHICLE REARVIEW MIRROR SYSTEM, now U.S. Pat. No. 6,918,674 which is hereby incorporated herein by reference.

Preferably, the near infrared absorbing filters or film or compound can be formed by incorporation (such as by casting, molding, mixing, and the like) of near infrared dyes into the optically coupling medium, such as by incorporation or mixing into an uncured optical adhesive or by incorporation or inclusion into a laminating interlayer, such as a polyvinyl butyral (PVB) or a silicone laminating interlayer. For example, EPOLIGHT near infrared absorbing dyes available from Epolin Inc. of Newark, N.J. can be used such as Epolin Class III-IV Dyes such as Epolin 2057 or Epolin 1117 or Epolin 2189 or Epolin 2062 or Epolin 2060. Such dyes typically comprise metal inorganic materials such as nickel complexes and the like. Such infrared attenuating dyes may be included in any light-transmitting lenses/apertures/EMC shields and the like disposed in front of such photo-sensors.

The optical medium or material or layer 30 of transflective reflective element 14 may comprise an optically matching adhesive that may optically match the optical qualities of the prism. For example, the optical medium or material may comprise an optical adhesive layer, such as an acrylic adhesive, a urethane adhesive, a silicone adhesive or epoxy adhesive or the like, with a refractive index (measured at the sodium D line) of preferably approximately 1.4 to approximately 1.6, more preferably approximately 1.45 to approximately 1.55, more preferably approximately 1.5 to approximately 1.54, such as approximately 1.52. The optical medium or layer thus substantially matches the optical qualities or characteristics of the prism material, such as glass (which has a refractive index of approximately 1.52), and thus is not readily discernable via looking through the prism element by a driver or occupant of the vehicle. Such optical mediums or adhesives are known, such as the adhesive commercially available from Norland Products, Inc., New Brunswick, N.J., and such as described in U.S. Pat. Nos. 5,073,012; 5,115,346; 5,355,245; and 5,523,877, which are hereby incorporated herein by reference.

Preferably, the optical medium or layer comprises a fluid layer that may flow onto the rear surface 18*a* of prism element 18, and may fill in any scratches or imperfections present on the rear surface 18*a*. Because the optical medium or layer may substantially match the optical qualities or characteristics of the prism element 18, the optical medium may function to substantially optically mask or hide the imperfections in surface 18*a* such that they are not visible or discernible by a person looking at or through the reflective element 14. By utilizing an optical medium that, in its precursor and/or uncured form, is capable of flow into and fill of imperfections on the surface 18*a* of prism element 18, the present invention thus enables economical manufacture of transparent, uncoated/unpainted prism elements, without the need for extraordinary steps to protect surface 18*a* during prism element fabrication and without the need to polish or otherwise prepare surface 18*a* for receipt of a thin film coating or the like.

The display on demand (DOD) prismatic reflective element 14 thus may provide a display on demand/transflective type of display for a prismatic reflective element (or another automotive reflective element) and may be readily manufactured. More particularly, the prism element may be formed as an uncoated/unpainted window element, and without passing through a silver line, while sheets of thin glass (such as approximately 1.1 mm to approximately 1.6 mm or other thicknesses, such as approximately 0.5 mm to approximately 1 mm or greater than approximately 1.6 mm or the like, depending on the particular application of the prismatic reflective element) are coated with the transflective layer or layers. The sheets of thin glass may be coated in an efficient manner without requiring the special fixturing of individual shapes in the chamber. The coated sheet may then be cut into glass substrates/shapes that are in the shape of the prism element. The transflective layer of the coated substrate may be covered or coated with the layer of optical adhesive and the substrate may be pressed against the surface of the prism element and optically coupled to or adhered to the prism element to form the transflective prismatic reflective element. The optical medium or adhesive layer may be heated through the prism element or substrate or may be exposed to ultraviolet radiation through the prism element or substrate to cure the optical medium or adhesive. The optically matching medium or material may fill in and occupy and optically mask any imperfections or scratches that may be present on the surface of the prism, such that the imperfections will not be visible or discernible and such that the prism element need not be polished prior to the bonding or adhering of the coated substrate to the prism. Advantageously, the adhering or laminating of the material to the prism element could also provide shatterproofing/scatter protection characteristics to the prism element.

Although described above as being adhered to the prism element with an optically matching adhesive layer, it is envisioned that a coated glass or plastic sheet or substrate may be otherwise optically coupled to or applied to or bonded to a prism element to form the display on demand, transflective prismatic reflective element, without affecting the scope of the present invention. For example, a plastic or polymer sheet or film, such as a Mylar film or the like, may be laminated to the surface of the prism, such as via heating the sheet or film and applying the heated sheet or film to the surface of the prism, such as utilizing principles described in U.S. Pat. Nos. 5,073,012; 5,115,346; 5,355,245; and 5,523,877, and/or in U.S. patent application Ser. No. 10/709,434, filed May 5, 2004 by Lynam for MIRROR REFLECTIVE ELEMENT, which are hereby incorporated herein by reference.

Optionally, a laminating interlayer, such as a polyvinyl butyral or silicone interlayer may be heated and applied and pressed against the prism surface 18*a* (such as in an autoclave process or in a hot press process or the like) to bond or attach to the prism, without affecting the scope of the present invention. An example of suitable lamination materials and techniques is disclosed in U.S. Pat. No. 5,587,236, which is hereby incorporated herein by reference. The laminating interlayer may be provided as a sheet or film that may be heated to a pliable/malleable state such that the heated pliable/malleable sheet or film may be pressed or urged against surface 18*a* of prism element 18 to fill in and occupy scratches and imperfections in the surface of the prism element as the sheet or film is applied thereto. Preferably, and such as discussed above with respect to the optical matching adhesive, the laminating interlayer or sheet or film substantially matches the refractive index and optical qualities or characteristics of the prism.

Optionally, if it is desired to form a display on demand, transflective display on an already silvered/painted prism, the protective paint layer and reflective layer may be removed from the surface of the prism element (such as by chemical etching or laser etching), and a transparent coated substrate may be applied and optically coupled or connected to the etched surface at the window. However, this can be a somewhat costly step, both in potential yield loss and potential damage to the prism.

Optionally, the rear surface of the prism element may be coated with a transflective layer or layers and then painted or coated with a clear lacquer or the like to protect the transflective layer or layers. The lacquer may be optically matched with the refractive index of the prism element so as to be substantially not discernable or visible through the prism element and transflective layer or layers and to fill in and effectively optically mask or hide any imperfections present on the surface of the prism element and transflective layer or layers. A thin glass substrate may then be adhered to the lacquer to protect the lacquer and transflective layer or layers, such as described above.

Optionally, for example, the transflective reflector coated surface may have a silicon coating or layer (or doped silicon coating or layer) thereon, such as the types described in U.S. Pat. Nos. 6,286,965; 6,196,688; 6,065,840; 5,751,489; and 5,535,056; and/or in U.S. provisional application Ser. No. 60/563,342, filed Apr. 19, 2004 by Bareman et al. for METHOD OF MANUFACTURING ELECTRO-OPTIC MIRROR CELL, which are hereby incorporated herein by reference. The transflective coating [such as a coating of silicon or similar high index semiconductor material or of a thin metallic coating (less than about 400 angstroms physical thickness preferred; less than about 300 angstroms more preferred and less than about 250 angstroms most preferred), such as of silver or of a silver alloy (such as with gold or with platinum or with palladium) or of aluminum or of an aluminum alloy (such as an aluminum/titanium alloy)] may be applied to or disposed on the rear surface of the prism element, and the transparent second or rear element or substrate (that is uncoated) may be adhered to or positioned at the transflective coating of the rear surface of the prism element and may principally serve a protective function for the transflective coating. Optionally, the second or rear element or substrate may be replaced by an optically transmitting plastic substrate/film/lacquer or the like, without affecting the scope of the present invention. Thus, for example, a 6 mm to 6.5 mm or thereabouts thick flat glass sheet that is transflective coated on one side with a silicon or doped silicon coating (or with a multilayer coating stack comprising at least one silicon or doped silicon layer) may be procured. An interior mirror shape may be cut therefrom and the non-transflective coated side may be ground away to form a prism element. Then, a light transmitting protective substrate or layer may be applied (such as by adhesion or by coating or by lamination or the like) to the transflective coating as a protectant against physical, mechanical or environmental damage. Alternately, and in some cases preferably, a light transmitting protective substrate or layer may be applied to the transflective coating on the rear surface of the flat glass shape as a protectant against physical, mechanical or environmental damage before the opposing front surface is ground away to form the prism element (and so the light transmitting protective substrate or layer so applied to the transflective coating acts as its protectant against physical, mechanical or environmental damage while the glass is being ground away to form a wedge-shaped prism element). Note that prism grinding may be via in-line grinding or via Blanchard grinding, as known in the automotive interior prism mirror manufacturing art. Also, aspects of the present invention apply to non-glass prism elements and/or rear elements such as elements formed of an optical plastic such as acrylic, polycarbonate, polystyrene, CR-39 or COC olefin.

The display on demand transflective prismatic reflective element of the present invention thus may provide an economical display on demand transflective prismatic reflective element, because the prism element may be economically manufactured and need not have both surfaces polished or otherwise formed to a substantially unscratched, pristine surface, while the sheet or film may be coated in an economical manner without requiring the special fixturing that may typically be required for coating wedge-shaped prisms. The prismatic reflective element utilizes a dedicated coating or display on demand process for coating the glass or plastic or polymeric sheet or film with a transflective layer or layers, and also utilizes a dedicated prism making process for making wedge-shaped prisms, and thus avoids the costs and difficulties associated with coating prisms and/or grinding and polishing a surface of a prism element after the other surface has been coated with a reflective or transflective coating.

Also, the thin glass or polymeric substrate of the display on demand prismatic reflective element of the present invention protects the transflective layer or layers from physical damage and protects the transflective layer or layers from the elements by sealing the transflective layer or layers between the prism element and the substrate as the substrate and transflective layer or layers are secured to or adhered to or bonded to or laminated to the prism element. The optical medium or adhesive or laminate may be optically matched to the optical qualities or characteristics of the prism element to effectively optically mask or hide imperfections that may be present on the surface of the prism element to which the coated glass or polymeric shape or substrate or film is applied. Advantageously, the adhering or laminating of the material to the prism element could also provide shatterproofing/scatter protection characteristics to the prism element.

Although shown and described as having a substantially uncurved prism element and thus a substantially flat and uncurved coated shape or substrate, it is envisioned that the mirror assembly may have a curved or bent reflective element, without affecting the scope of the present invention. In such applications where the prism element may be curved or bent, the coated shape or substrate may be correspondingly curved or bent or may be flexible to curve or bend to substantially uniformly mate with the rear surface of the prism element and to adhere to the prism element via the optically matching medium.

Optionally, the optical matching medium 30 of the prismatic reflective element may incorporate ultraviolet radiation reducing means for reducing ultraviolet radiation transmission through the reflective element and/or may incorporate near infrared reflecting means for reducing transmission of near infrared radiation through the reflective element, such as described in U.S. Pat. Nos. 5,115,346; 5,355,245; and 5,523,877, which are hereby incorporated herein by reference. For example, a UV curable, pourable adhesive can be used to retain the coated shape to the prism element while simultaneously reducing UV transmission. A suitable ultraviolet curing polyurethane adhesive modified so as to be UV curable is Norland NOA 65™, available from Norland Products, Inc., New Brunswick, N.J., which is water clear, highly transparent to visible light, includes a moderate modulus of elasticity when cured such that it is not overly brittle and does not fracture upon impact, and includes an index of refraction of 1.52 matched substantially perfectly to that of soda lime glass (which has a refractive index of 1.52). Norland NOA 65™ also adheres well to glass, is of relatively low viscosity (1,200 centipoises) such that it easily pours and spreads between two glass panels to allow lamination once cured. It also has a relatively low modulus of elasticity (20,000 p.s.i.). Its ability to be cured with UV radiation is well-suited to manufacturing processing.

Alternately, Norland NOA 68™, also a polyurethane adhesive modified so as to be UV curable and also available from Norland Products, Inc., can be used. Norland NOA 68™ has a refractive index of 1.54 that is matched closely with clear soda lime glass. It has a modulus of 20,000 p.s.i. when cured and has an excellent adhesion to glass. Norland NOA 61™, which is a polyurethane adhesive modified so as to be UV curable, can also be used although, with a modulus when cured of 150,000 p.s.i., it is somewhat more brittle. Alternately, DYMAX LIGHT-WELD 478™ acrylic adhesive available from Dymax Corporation of Torrington, Conn. can be used. This is a UV curing acrylic of Shore D hardness 65 that has a refractive index of 1.507 when cured, which is very close to that of soda lime glass. Alternately, conventionally known UV curing optical epoxies, preferably of low modulus or with their modulus reduced through addition of reactive diluents and reactive flexibilizers, as is commonly known, can be used.

As shown in FIG. 2, mirror assembly 10 may include a circuit board 36, which may be supported by the mirror casing or rear portion 16, and which may include one or more accessories or circuitry 38 and associated manual inputs or controls or buttons 40 for providing manual control of the circuitry or accessory 38. For example, circuitry 38 may comprise circuitry for a garage door opening device or system, such as a universal garage door opener or the like. One or more buttons 40 (and/or one or more lights or illuminated buttons or controls) may extend or project from circuitry 38 and may extend at least partially through or may be accessible through corresponding openings or holes in bezel portion 12. The buttons 40 may be accessible by the driver or occupant of the vehicle to actuate or control the circuitry 38, such as to actuate a transmitting device to open or close a garage door, such as utilizing the principles disclosed in U.S. Pat. Nos. 6,396,408; 6,362,771; 5,798,688; and 5,479,155, and/or U.S. patent application Ser. No. 10/770,736, filed Feb. 3, 2004, now U.S. Pat. No. 7,023,322 which are hereby incorporated herein by reference.

Optionally, the circuit board may support one or more other accessories and/or corresponding displays at or within the bezel portion, such as a tire pressure monitoring system and display, whereby the display may indicate when a tire pressure has dropped below a set or preselected tire pressure. The display may be a transflective display or display element, or may include one or more illumination sources positioned at a laser etched or otherwise formed window or icon or the like on the reflective element, and may provide for illumination (via one or more illumination sources at the circuit board) of one or more icons representative of a particular tire of the vehicle. The display may further provide for illumination of an additional icon or character or may provide a different color illumination when a puncture is detected at one of the tires of the vehicle. The tire pressure monitoring system may utilize principles disclosed in U.S. Pat. Nos. 6,124,647; 6,294,989; 6,445,287; 6,472,979; and/or 6,731,205, and/or U.S. provisional application Ser. No. 60/611,796, filed Sep. 21, 2004 by O'Brien for TIRE PRESSURE ALERT SYSTEM which are hereby incorporated herein by reference. Optionally, the mirror assembly may include other types of displays, such as a compass display having multiple illumination sources or light emitting diodes similar to the compass display described in U.S. patent applications Ser. No. 10/456,599, filed Jun. 6,2003 by Weller et al. for INTERIOR REARVIEW MIRROR SYSTEM WITH COMPASS, now U.S. Pat. No. 7,004,593; and/or Ser. No. 10/933,842, filed Sep. 3, 2004 which are hereby incorporated herein by reference in their entireties, and as discussed below.

Optionally, the circuit board may support one or more other accessories or features at or within the mirror assembly, such as one or more electrical or electronic devices or accessories, such as lights, such as map reading lights or one or more other lights or illumination sources (which may be positioned at or aligned with openings formed in the bottom of the bezel portion to direct illumination generally downward to illuminate the console of the vehicle), such as illumination sources of the types disclosed in U.S. Pat. Nos. 6,690,268; 5,938,321; 5,813,745; 5,820,245; 5,673,994; 5,649,756; 5,178,448; 5,671,996; 4,646,210; 4,733,336; 4,807,096; 6,042,253; and/or 5,669,698, and/or U.S. patent applications Ser. No. 10/054,633, filed Jan. 22, 2002, now U.S. Pat. No. 7,195,381; and/or Ser. No. 10/745,056, filed Dec. 22, 2004 by Lynam for LIGHT MODULE FOR INTERIOR REARVIEW MIRROR ASSEMBLY, now U.S. Pat. No. 6,971,775, microphones (which may comprise analog microphones or digital microphones and may be positioned at or aligned with one or more openings formed in the top and/or bottom of the cap portion or the bezel portion), such as for interfacing with a vehicle telematics system or the like, such as microphones of the types disclosed in U.S. Pat. Nos. 6,243,003; 6,278,377; and/or 6,420, 975, and/or in PCT Application No. PCT/US03/30877, filed Oct. 1, 2003 by Donnelly Corp. et al. for MICROPHONE SYSTEM FOR VEHICLE, speakers, antennas, including global positioning system (GPS) or cellular phone antennas, such as disclosed in U.S. Pat. No. 5,971,552, a communication module, such as disclosed in U.S. Pat. No. 5,798,688, a voice recorder, a telematics system, such as an ONSTAR® system as found in General Motors vehicles and such as described in U.S. Pat. Nos. 4,862,594; 4,937,945; 5,131, 154; 5,255,442; 5,632,092; 5,798,688; 5,971,552; 5,924, 212; 6,243,003; 6,278,377; and 6,420,975; 6,477,464; and/ or 6,678,614; and/or U.S. patent applications Ser. No. 10/456,599, filed Jun. 6, 2003 by Weller et al. for INTERIOR REARVIEW MIRROR SYSTEM WITH COMPASS, now U.S. Pat. No. 7,004,593; Ser. No. 10/645,762, filed Aug. 20, 2003 by Taylor et al. for VEHICLE NAVIGATION SYSTEM FOR USE WITH A TELEMATICS SYSTEM, now U.S. Pat. No. 7,167,796; Ser. No. 10/422,378, filed Apr. 24, 2003 by Schofield for IMAGING SYSTEM FOR VEHICLE, now U.S. Pat. No. 6,946,978; and Ser. No. 10/964,512, filed Oct. 13, 2004 by Schofield et al. for VEHICLE COMMUNICATION SYSTEM; and/or PCT Application No. PCT/US03/40611, filed Dec. 19, 2003 by Donnelly Corporation et al. for ACCESSORY SYSTEM FOR VEHICLE, and/or PCT Application No. PCT/US03/ 308877, filed Oct. 1, 2003 by Donnelly Corp. for MICROPHONE SYSTEM FOR VEHICLE, a blind spot detection system, such as disclosed in U.S. Pat. Nos. 5,929,786 and/or 5,786,772, a side object detection and warning system, such as disclosed in U.S. patent applications Ser. No. 10/427,051, filed Apr. 30, 2003, now U.S. Pat. No. 7,038,577; and Ser. No. 10/209,173, filed Jul. 31, 2002, now U.S. Pat. No. 6,882,287, transmitters and/or receivers, such as for a garage door opener or a vehicle door unlocking system or the like (such as a remote keyless entry system), a digital network, such as described in U.S. Pat. No. 5,798,575, a high/low headlamp controller, such as disclosed in U.S. Pat. Nos. 5,796,094 and/or 5,715,093, a rain sensor, such as the types described in U.S. Pat. Nos. 6,250,148 and 6,341,523, an imaging device, such as an imaging array sensor for imaging systems of the types described in U.S. Pat. Nos. 6,757,109; 6,717,610; 6,396,397; 6,201,642; 6,353,392; 6,313,454; 6,396,397; 5,550,677; 5,670,935; 5,796,094; 5,877,897; 6,097,023; and 6,498,620, and U.S. patent applications Ser. No. 09/441,341, filed Nov. 16, 1999 by Schofield et al. for VEHICLE HEADLIGHT CONTROL USING IMAGING SENSOR, and Ser. No. 10/427,051, filed Apr. 30, 2003 by Pawlicki et al. for OBJECT DETECTION SYSTEM FOR VEHICLE, now U.S. Pat. No. 7,038,577, and/or U.S. provisional applications Ser. No. 60/562,480, filed Apr. 15, 2004 by Schofield for IMAGING SYSTEM FOR VEHICLE; Ser. No. 60/607,963, filed Sep. 8, 2004 by Schofield for IMAGING SYSTEM FOR VEHICLE; Ser. No. 60/614,644, filed Sep. 30, 2004 by Camilleri et al. for CAMERA DISPLAY SYSTEM; and Ser. No. 60/618,686, filed Oct. 14, 2004 by Laubinger for VEHICLE IMAGING SYSTEM, a memory mirror system, such as disclosed in U.S. Pat. No. 5,796,176, a hands-free phone attachment, a video device for internal cabin surveillance (such as for sleep detection or driver drowsiness detection or the like) and/or video telephone function, such as disclosed in U.S. Pat. Nos. 5,760,962 and/or 5,877,897, a remote keyless entry receiver, a seat occupancy detector, a remote starter control, a yaw sensor, a clock, a carbon monoxide detector, status displays, such as displays that display a status of a door of the vehicle, a transmission selection (4wd/2wd or traction control (TCS) or the like), an antilock braking system, a road condition (that may warn the driver of icy road conditions) and/or the like, a trip computer, an ONSTAR® system and/or the like (with all of the above-referenced patents and PCT and U.S. patent applications being commonly assigned to Donnelly Corporation, and with the disclosures of the referenced patents and PCT and U.S. patent applications being hereby incorporated herein by reference in their entireties).

Optionally, the mirror assembly may include one or more user actuatable inputs or user interface buttons or devices or switches or the like for actuating or controlling or adjusting an accessory or display of the mirror assembly or of the vehicle. For example, the user inputs may comprise buttons or switches, such as user inputs of the types described in PCT Application No. PCT/US2003/036177, filed Nov. 14, 2003 by Donnelly Corp. for IMAGING SYSTEM FOR VEHICLE and/or PCT Application No. PCT/US04/015424, filed May 18, 2004 by Donnelly Corporation et al. for MIRROR ASSEMBLY FOR VEHICLE, which are hereby incorporated herein by reference, touch sensors or proximity sensing inputs or the like, such as sensors of the types described in U.S. Pat. Nos. 6,001,486; 6,310,611; 6,320,282; 6,627,918; and 5,594,222; and/or U.S. Pat. Publication No. 2002/0044065, published Apr. 18, 2002 by Quist et al. for INTERACTIVE AUTOMOTIVE REARVISION SYSTEM; U.S. patent application, Ser. No. 10/933,842, filed Sep. 3, 2004; and/or Ser. No. 10/956,749, filed Oct. 1, 2004 by Schofield et al. for MIRROR REFLECTIVE ELEMENT ASSEMBLY INCLUDING ELECTRONIC COMPONENT; and/or PCT Application No. PCT/US03/40611, filed Dec. 19, 2003 by Donnelly Corp. et al. for ACCESSORY SYSTEM FOR VEHICLE, which are hereby incorporated herein by reference, or may comprise inputs molded within the bezel of the mirror assembly, such as described in U.S. provisional applications, Ser. No. 60/535,559, filed Jan. 9, 2004 by Lindahl for MIRROR ASSEMBLY; and/or Ser. No. 60/553,517, filed Mar. 16, 2004 by Lindahl et al. for MIRROR ASSEMBLY, which are hereby incorporated herein by reference, or may comprise membrane type switches, such as described in U.S. provisional applications Ser. No. 60/575,904, filed Jun. 1, 2004 by Uken for MIRROR ASSEMBLY FOR VEHICLE; and Ser. No. 60/624,320, filed Nov. 2, 2004, which is hereby incorporated herein by reference; and/or the like, without affecting the scope of the present invention.

Therefore, the display on demand transflective prismatic reflective element of the present invention may provide an economical display on demand transflective prismatic reflective element. Also, the thin glass or polymeric substrate of the display on demand prismatic reflective element of the present invention protects the transflective layer or layers from physical damage and protects the transflective layer or layers from the elements by sealing the transflective layer or layers between the prism element and the substrate as the substrate and transflective layer or layers are optically coupled to or secured to or adhered to or bonded to or laminated to the prism. The optical medium, such as an optical adhesive or laminate or the like, may be optically matched to the refractive index of the prism element to effectively optically mask or hide imperfections that may be present on the surface of the prism element to which the coated glass or polymeric shape or substrate or film is applied. The present invention thus may provide a low cost display on demand or transflective prismatic reflective element that may reduce visibility of imperfections that may exist on a surface of the prism.

Changes and modifications in the specifically described embodiments may be carried out without departing from the principles of the present invention, which is intended to be limited only by the scope of the appended claims as interpreted according to the principles of patent law.

The embodiments of the invention in which an exclusive property or privilege is claimed are defined as follows:

1. An interior rearview mirror assembly for a vehicle, said interior rearview mirror assembly comprising:
 a prismatic mirror element, said prismatic mirror element comprising a first element, said first element being a wedge-shaped prism element having a front surface and a rear surface, said front surface generally facing a driver of the vehicle when said interior rearview mirror assembly is installed in the vehicle, said rear surface being opposite said front surface, said front surface being slanted at an angle relative to said rear surface;
 said prismatic mirror element further comprising a second element, said second element being a substrate having a transflective reflector coated on a first surface thereof, said transflective reflector coated first surface of said second element being attached to said rear surface of said first element via an optically matching medium, wherein said optically matching medium is sandwiched between said transflective reflector on said first surface of said second element and said rear surface of said first element; and
 at least one display element positioned to the rear of said second element of said prismatic mirror element and operable to display information through said second element, through said transflective reflector, through said optically matching medium and through said first element of said prismatic mirror element so as to be viewable by the driver of the vehicle when said display element is operated so as to emit visible light.

2. The interior rearview mirror assembly of claim 1, wherein said optically matching medium comprises an optical adhesive.

3. The interior rearview mirror assembly of claim 2, wherein said optical adhesive comprises a fluid layer that flows onto at least one of said rear surface of said first element and said second element.

4. The interior rearview mirror assembly of claim 2, wherein said optical adhesive comprises a pliable interlayer that is disposed onto at least one of said rear surface of said first element and said second element.

5. The interior rearview mirror assembly of claim 1, wherein said optically matching medium comprises one of a liquid and a pliable material and substantially fills in scratches and imperfections on said rear surface of said first element when applied thereto.

6. The interior rearview mirror assembly of claim 1, wherein said optically matching medium has a refractive index that substantially matches a refractive index of said first element.

7. The interior rearview mirror assembly of claim 1, wherein said first element comprises a glass prism element and said optically matching medium having a refractive index that is substantially similar to the refractive index of said glass prism element.

8. The interior rearview mirror assembly of claim 7, wherein said optically matching medium has a refractive index between approximately 1.4 and 1.6.

9. The interior rearview mirror assembly of claim 7, wherein said optically matching medium has a refractive index between approximately 1.45 to 1.55.

10. The interior rearview mirror assembly of claim 7, wherein said optically matching medium has a refractive index of approximately 1.52.

11. The interior rearview mirror assembly of claim 1, wherein said transflective reflector comprises at least one layer.

12. The interior rearview mirror assembly of claim 11, wherein said at least one layer comprises at least one of silver, aluminum, aluminum alloy, and silver alloy.

13. The interior rearview mirror assembly of claim 12, wherein said transflective reflector includes at least one non-metallic substantially transparent layer.

14. The interior rearview mirror assembly of claim 12, wherein said transflective reflector includes at least one layer comprising at least one of doped tin oxide, undoped tin oxide, indium tin oxide, indium cerium oxide, indium tungsten oxide, indium oxide, and zinc oxide.

15. The interior rearview mirror assembly of claim 1, wherein said rear surface of said first element is substantially planar.

16. The interior rearview mirror assembly of claim 1, wherein said rear surface of said first element is curved, said second element conforming to said curved rear surface.

17. An interior rearview mirror assembly for a vehicle, said interior rearview mirror assembly comprising:
 a prismatic mirror element, said prismatic mirror element comprising a first wedge-shaped prism element having a front surface and a rear surface, said front surface generally facing a driver of the vehicle when said interior rearview mirror assembly is installed in the vehicle, said rear surface being opposite said front surface;
 said prismatic mirror element further comprising a second element, said second element being a substrate having a front surface and a rear surface, said front surface of said second element opposing said rear surface of said first prism element, said front surface of the first prism element being slanted at an angle relative to said rear surface of the first prism element;
 said prismatic mirror element further comprising a transflective reflector disposed on at least one of said rear surface of said first prism element and said front surface of said second element;
 said prismatic mirror element further comprising an optically matching medium, said second element being attached to said first prism element via said optically matching medium disposed between said front surface of said second element and said rear surface of said first prism element, said optically matching medium having a refractive index that substantially matches a refractive index of said first prism element, wherein said transflective reflector and said optically matching medium are sandwiched between said rear surface of said first prism element and said front surface of said second element; and
 said interior rearview mirror assembly further comprising at least one display element positioned to the rear of said second element of said prismatic mirror element and operable to display information through said second element, through said transflective reflector, through said optically matching medium and through said first prism element of said prismatic mirror element so as to be viewable by the driver of the vehicle when said display element is operated so as to emit visible light.

18. The interior rearview mirror assembly of claim 17, wherein said optically matching medium comprises an optical adhesive.

19. The interior rearview mirror assembly of claim 18, wherein said optical adhesive comprises a fluid layer that flows onto at least one of said rear surface of said first prism element and said front surface of said second element.

20. The interior rearview mirror assembly of claim 18, wherein said optical adhesive comprises a pliable interlayer that is disposed onto at least one of said rear surface of said first prism element and said second element.

21. The interior rearview mirror assembly of claim 17, wherein said optically matching medium comprises one of a liquid and a pliable material and substantially fills in scratches and imperfections on at least one of said rear surface of said first prism element and said front surface of said second element when applied thereto.

22. The interior rearview mirror assembly of claim 17, wherein said transflective reflector is disposed on said front surface of said second element.

23. The interior rearview mirror assembly of claim 17, wherein said first prism element comprises a glass prism element and said optically matching medium having a refractive index that is substantially similar to the refractive index of said glass prism element.

24. The interior rearview mirror assembly of claim 23, wherein said optically matching medium has a refractive index between approximately 1.4 and 1.6.

25. The interior rearview mirror assembly of claim 23, wherein said optically matching medium has a refractive index between approximately 1.45 to 1.55.

26. The interior rearview mirror assembly of claim 23, wherein said optically matching medium has a refractive index of approximately 1.52.

27. The interior rearview mirror assembly of claim 17, wherein said transflective reflector comprises at least one layer.

28. The interior rearview mirror assembly of claim 27, wherein said at least one layer comprises at least one of silver, aluminum, aluminum alloy, and silver alloy.

29. The interior rearview mirror assembly of claim 28, wherein said transflective reflector includes at least one non-metallic substantially transparent layer.

30. The interior rearview mirror assembly of claim 27, wherein said at least one layer is deposited on said first surface of said second element.

31. The interior rearview mirror assembly of claim 17, wherein said rear surface of said first prism element is substantially planar.

32. The interior rearview mirror assembly of claim 17, wherein said rear surface of said first prism element is curved, said second element conforming to said curved rear surface

* * * * *